United States Patent
Jampani et al.

(10) Patent No.: US 11,098,894 B2
(45) Date of Patent: Aug. 24, 2021

(54) MULTIFUNCTIONAL FLUIDIC BURNER

(71) Applicants: Megha Jampani, Depew, NY (US);
Bryan R Bielec, Hamburg, NY (US);
Larry E Cates, Brownburg, IN (US);
Joseph A Maiolo, Grimsby (CA);
Stephen A Manley, Lukin, TX (US)

(72) Inventors: Megha Jampani, Depew, NY (US);
Bryan R Bielec, Hamburg, NY (US);
Larry E Cates, Brownburg, IN (US);
Joseph A Maiolo, Grimsby (CA);
Stephen A Manley, Lukin, TX (US)

(73) Assignee: Praxair Technology, Inc., Danbury, CT (US)

( * ) Notice: Subject to any disclaimer, the term of this patent is extended or adjusted under 35 U.S.C. 154(b) by 10 days.

(21) Appl. No.: 16/452,878

(22) Filed: Jun. 26, 2019

(65) Prior Publication Data
US 2020/0018479 A1   Jan. 16, 2020

Related U.S. Application Data

(60) Provisional application No. 62/696,587, filed on Jul. 11, 2018.

(51) Int. Cl.
*F23D 14/22* (2006.01)
*F23D 14/84* (2006.01)
(Continued)

(52) U.S. Cl.
CPC ............. *F23D 14/22* (2013.01); *F23D 14/32* (2013.01); *F23D 14/84* (2013.01); *F23L 7/007* (2013.01)

(58) Field of Classification Search
CPC .. F23C 2700/04; F23C 2700/063; F27D 3/16; F27D 11/101; F27D 14/06; F27D 14/22;
(Continued)

(56) References Cited

U.S. PATENT DOCUMENTS 1,931,589 A * 10/1933 Roberts .................... F23D 14/04
431/347
4,475,885 A * 10/1984 Finke ..................... F23D 14/22
431/182
(Continued)

FOREIGN PATENT DOCUMENTS

EP     0491325 A2    6/1992
EP     0545357 A1    6/1993
(Continued)

OTHER PUBLICATIONS

Engineering Tool Box, (2005). Classification of Gases. [online] Available at: https://www.engineeringtoolbox.com/classifications-gases-d_838.html (Year: 2005).*
(Continued)

*Primary Examiner* — Steven B McAllister
*Assistant Examiner* — Mark P Yost
(74) *Attorney, Agent, or Firm* — Donald T. Black

(57) ABSTRACT

A burner that is useful for providing a melting flame whose axis can be altered during operation, and for providing a supersonic jet of oxidant that can penetrate through the surface of the molten material, has a unique combination of features including a specially contoured flame collar at its open discharge end.

11 Claims, 6 Drawing Sheets

(51) Int. Cl.
*F23D 14/32* (2006.01)
*F23L 7/00* (2006.01)

(58) Field of Classification Search
CPC .... F27D 14/32; C21C 5/32; F27C 5/00; F23L 7/007; F23D 14/22; F23D 14/32; F23D 14/58; F23D 14/70; F23D 14/84; F23R 3/16; F27B 3/22; F27B 2/225
USPC ....................................... 431/252, 8
See application file for complete search history.

(56) References Cited

U.S. PATENT DOCUMENTS

| | | | | |
|---|---|---|---|---|
| 5,044,935 | A * | 9/1991 | Peter | F23C 7/002 431/182 |
| 5,110,285 | A * | 5/1992 | Snyder | F23D 14/22 431/8 |
| 5,431,114 | A * | 7/1995 | Morita | F23D 17/00 110/265 |
| 5,554,022 | A * | 9/1996 | Nabors, Jr. | F23L 7/007 431/10 |
| 5,762,007 | A * | 6/1998 | Vatsky | F23D 1/02 110/104 B |
| 5,814,125 | A | 9/1998 | Anderson et al. | |
| 6,261,338 | B1 | 7/2001 | Mahoney et al. | |
| 6,599,121 | B2 * | 7/2003 | Gutmark | F23C 7/002 431/182 |
| 6,926,516 | B1 * | 8/2005 | Sudo | F23D 14/58 431/8 |
| 8,297,969 | B2 * | 10/2012 | Daneri | F23D 14/22 431/284 |
| 9,435,262 | B2 * | 9/2016 | Deiss | F02C 7/22 |
| 2009/0130617 | A1 * | 5/2009 | Cain | F23C 9/006 431/161 |
| 2011/0127702 | A1 | 6/2011 | Gautam et al. | |
| 2012/0031098 | A1 * | 2/2012 | Ginessin | F23R 3/283 60/740 |
| 2016/0238241 | A1 * | 8/2016 | Rousseau | F23D 14/22 |
| 2020/0080720 | A1 * | 3/2020 | Cates | F23D 14/56 |

FOREIGN PATENT DOCUMENTS

| | | |
|---|---|---|
| JP | 2005113200 A | 4/2005 |
| JP | 2013079753 A | 5/2013 |
| WO | 2007/008973 A2 | 1/2007 |
| WO | 2018/118752 A1 | 6/2018 |

OTHER PUBLICATIONS

Engineering Toolbox (Year: 2005), Classification of Gases, [online] Available at: https://www.engineeringtoolbox.com/classifications-gases-d_838.html.*

* cited by examiner

MULTIFUNCTIONAL FLUIDIC BURNER

RELATED APPLICATIONS

This application claims the benefit of U.S. Provisional Application Ser. No. 62/696,587, filed on Jul. 11, 2018, which is incorporated herein by reference.

FIELD OF THE INVENTION

The present invention relates to devices such as burners that are useful for establishing and utilizing high temperatures for melting solid material such as scrap metal.

BACKGROUND OF THE INVENTION

The operation of high-temperature industrial equipment, such as electric arc furnaces that are used in producing iron and steel, as well as other furnaces, often require melting of solid material such as scrap metal. Since such operations consume substantial quantities of energy, there is ongoing interest in improving the efficiency of such operations. The present invention provides advantages in the melting of solid material and also in the subsequent processing of the molten material to produce steel.

BRIEF SUMMARY OF THE INVENTION

One aspect of the present invention is a multifunctional burner, comprising (A) a body having:

a passageway through the body which has a central axis, wherein the passageway includes a conical converging section, a throat section, a conical diverging section, and a flared diverging section, all of which are coaxial with the central axis, wherein the conical converging section has an open upstream end and an open downstream end, wherein the width of the conical diverging section decreases in the direction toward its downstream end, wherein the interior surface of the converging section forms a constant angle relative to the central axis, preferably an angle of 2 degrees to 30 degrees;

the throat section has an open upstream end that is sealed to the downstream end of the conical converging section, and an open downstream end, and has a diameter D which is constant between its upstream and downstream ends;

the conical diverging section has an open upstream end that is sealed to the downstream end of the throat section and an open downstream end, wherein the width of the conical diverging section increases in the direction toward its downstream end, wherein the interior surface of the conical diverging section forms a constant angle relative to the central axis, preferably an angle of 2 degrees to 15 degrees;

the flared diverging section has an open upstream end that is sealed to the downstream end of the conical diverging section and an open downstream end, wherein the width of the flared diverging section increases in the direction toward its downstream end, wherein the angle between the central axis and a line tangent to a point on the interior surface of the flared diverging section increases with increasing distance of the point from the upstream end of the flared diverging section, and wherein, in a cross-sectional plane that contains the central axis, the interior surface of the flared diverging section is a section of a circle of radius R which is D/4 to 3D;

wherein the axial distance L from the downstream end of the throat section to the downstream end of the flared diverging section is D to 4D;

(B) one or more biasing gas passageways within the body of the burner, each ending in a downstream biasing gas opening in the throat section or the conical diverging section whose axis is substantially perpendicular to the central axis, each downstream biasing gas opening having a diameter d, wherein each downstream biasing gas opening opens in the throat section or the conical diverging section at a point within the range of from 3d/4 upstream to d/4 downstream of the point at which the downstream end of the throat section is sealed to the upstream end of the conical diverging section, each biasing gas passageway having an inlet which can be connected to a source of biasing gas;

(C) an annular port surface that lies in a plane perpendicular to the central axis and that surrounds and is sealed to the downstream end of the flared diverging section;

4 to 20 first ports in the annular port surface whose axes are parallel to the central axis, wherein the first ports are connected by first passageways within the body of the burner to one or more inlets through which gaseous fuel can be fed from outside the burner, and 4 to 20 second ports in the annular port surface whose axes are parallel to the central axis, wherein the second ports are connected by second passageways within the body of the burner to one or more inlets through which gaseous oxidant can be fed from outside the burner, the first and second passageways being separate from each other;

wherein the first ports are substantially evenly positioned in the port surface substantially uniformly distant from the central axis of the passageway, and the second ports are substantially evenly positioned in the port surface substantially uniformly distant from the central axis of the passageway;

(D) a flame collar surrounding and coaxial with the central axis, and having (i) an upstream end that is sealed to the port surface further from the central axis than the distance of the first and second ports from the central axis, (ii) an open downstream end whose diameter is larger than the diameter of its upstream end and which is located a distance downstream from the port surface that is at least 5% of the distance across the open downstream end of the flame collar, and (iii) an exposed surface that faces the central axis and extends from the upstream end to the downstream end, wherein the exposed surface includes one or more curved regions equal in number to the number of biasing gas openings, wherein each curved region lies on the surface of a different cone that opens outward toward the downstream end of the flame collar, the axis of each cone lying in the plane of the central axis and the axis of a different one of the biasing gas openings and extending from the central axis at the downstream end of the throat section in a direction parallel to the interior surface of the conical diverging section on the side opposite the location of the associated biasing gas opening; and (iv) passageways within the flame collar through which coolant can flow to absorb heat generated by combustion occurring at the burner; and (E) an outlet within the body in the conical converging section or upstream from the conical converging section from which gaseous oxidant can be fed into the body into the conical converging section along the central axis wherein said outlet is connected by a passageway in the body of the burner to an inlet through which gaseous oxidant can be fed from outside the burner.

Another aspect of the present invention is a method of treating material within a melting vessel, comprising (A) feeding gaseous oxidant into the conical converging section of the aforesaid burner, past the biasing gas openings and into the flame collar, feeding gaseous oxidant out of said second ports of the burner into the flame collar, and feeding gaseous fuel out of the first ports of the burner into the flame collar, and combusting said oxidant and said fuel in the flame collar to form a flame that emerges from the body of the burner past the open end of the flame collar along an axis;

(B) contacting the flame with material in a melting vessel at a first surface of the material and heating the material with the flame;

(C) intermittently feeding biasing gas out of the downstream end of a biasing gas opening to contact gaseous oxidant flowing past the biasing gas opening and thereby altering the axis of the flame to another axis with the biasing gas, and contacting the flame, when its axis has been altered, with the material in the melting vessel and heating the material with the flame;

repeating step (C) until the material is completely molten; and then (E) discontinuing the feeding of biasing gas; and (F) ejecting a stream of gaseous oxidant from within the passageway out of the flame collar at a supersonic velocity to penetrate through the surface of the molten material, while passing fuel out of the first ports, passing gaseous oxidant out of the second ports, and combusting said fuel and gaseous oxidant to establish a flame envelope around the stream of gaseous oxidant.

DETAILED DESCRIPTION OF THE INVENTION

Figure 1:
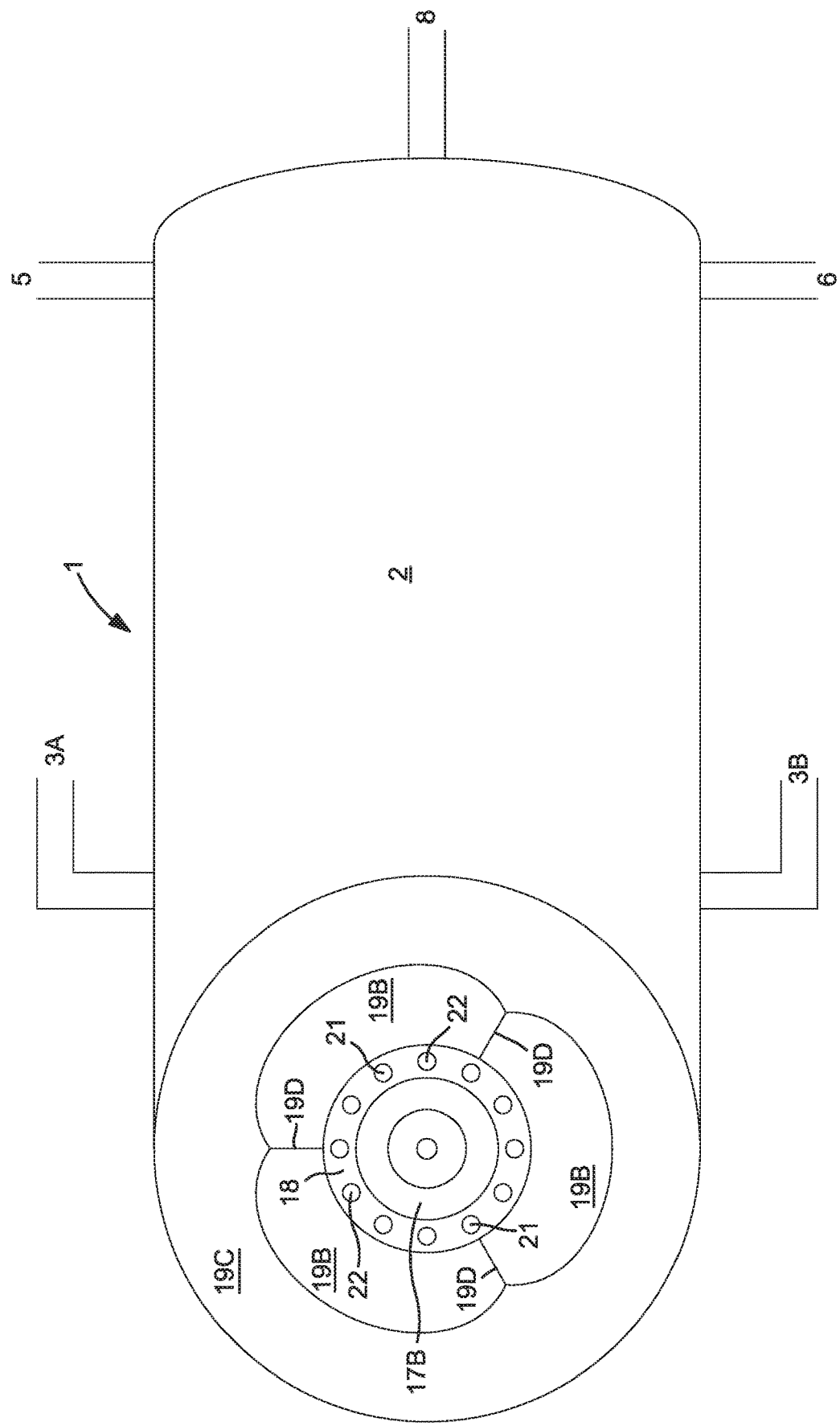
FIG. 1 is a perspective view of a burner of the present invention.

Turning first to FIG. 1, the exterior of burner 1 is shown. Burner 1 includes outer housing 2, whose exterior surface appears in FIG. 1. Outer housing 2 includes inlet line 3A through which cooling water can flow into internal passages 4 within the flame collar 19 of the burner (described further herein with respect to FIG. 2). Outer housing 2 also includes outlet line 3B through which cooling water exits from the internal passages 4.

Burner 1 also includes a feed line, represented as 5, to feed fuel into burner 1 that is to be combusted after passing out of ports 21 as described herein; and a separate feed line, represented as 6, to feed gaseous oxidant into burner 1 that after passing out of ports 22 is to be combusted with the fuel that passes out of ports 21 as described herein.

Burner 1 also includes a feed line, represented as 8, to feed gaseous oxidant into central passageway 13.

In use, feed line 5 can be connected to a source of fuel, which is preferably gaseous combustible hydrocarbon such as methane, propane, butane, or natural gas, and line 8 can be connected to a source of gaseous oxidant which may be air, oxygen-enriched air having an oxygen content of 22 vol. % to 75 vol. %, or higher purity oxygen having an oxygen content of at least 90 vol. % and preferably at least 95 vol. %. The connections to lines 5, 6 and 8 would each include suitable conventional controls such as valves to permit flow or to shut off flow, and to control the rates of flow.

Figure 2:
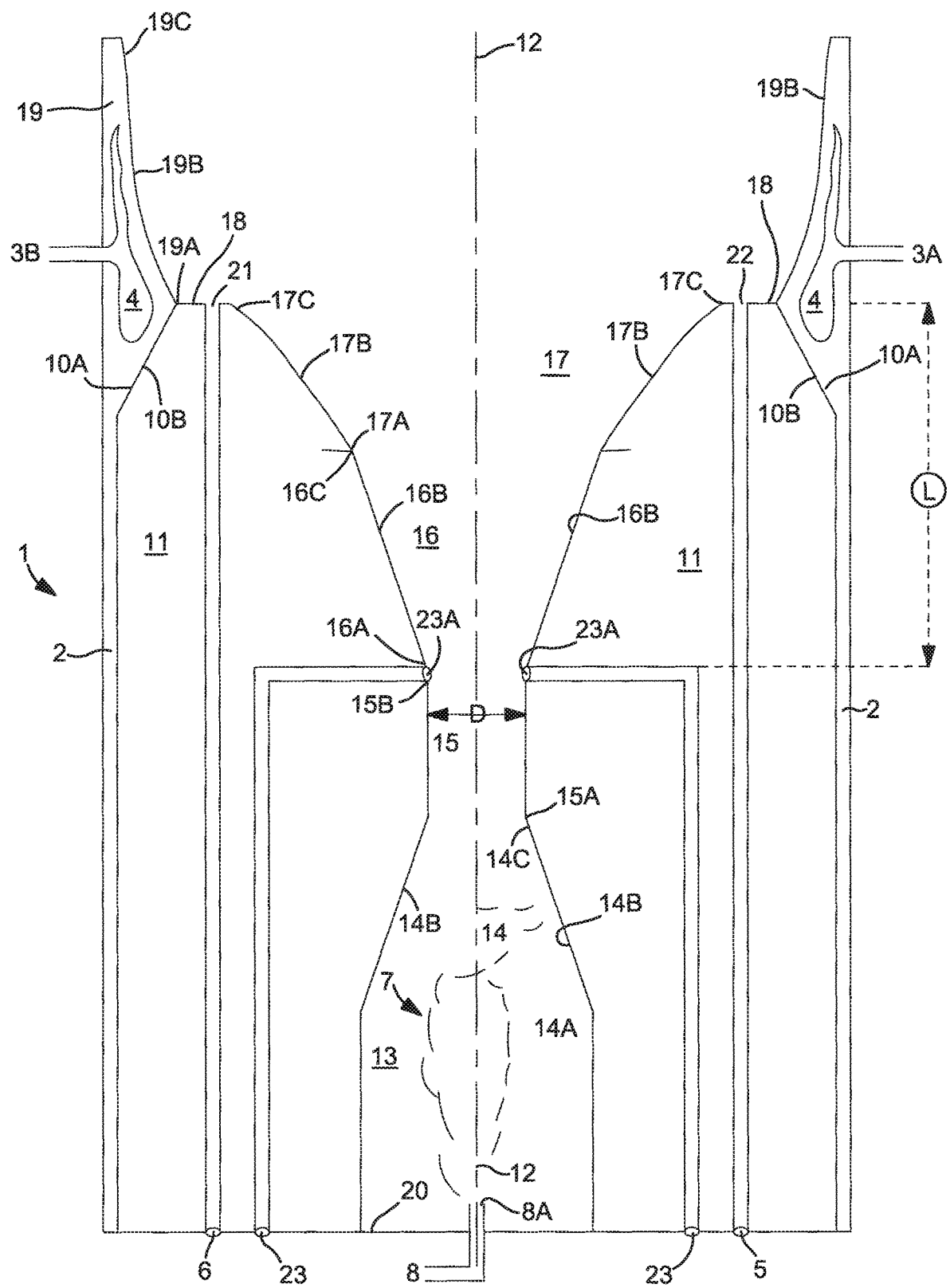
FIG. 2 is a cross-sectional view of a burner according to the present invention.
Figure 3:
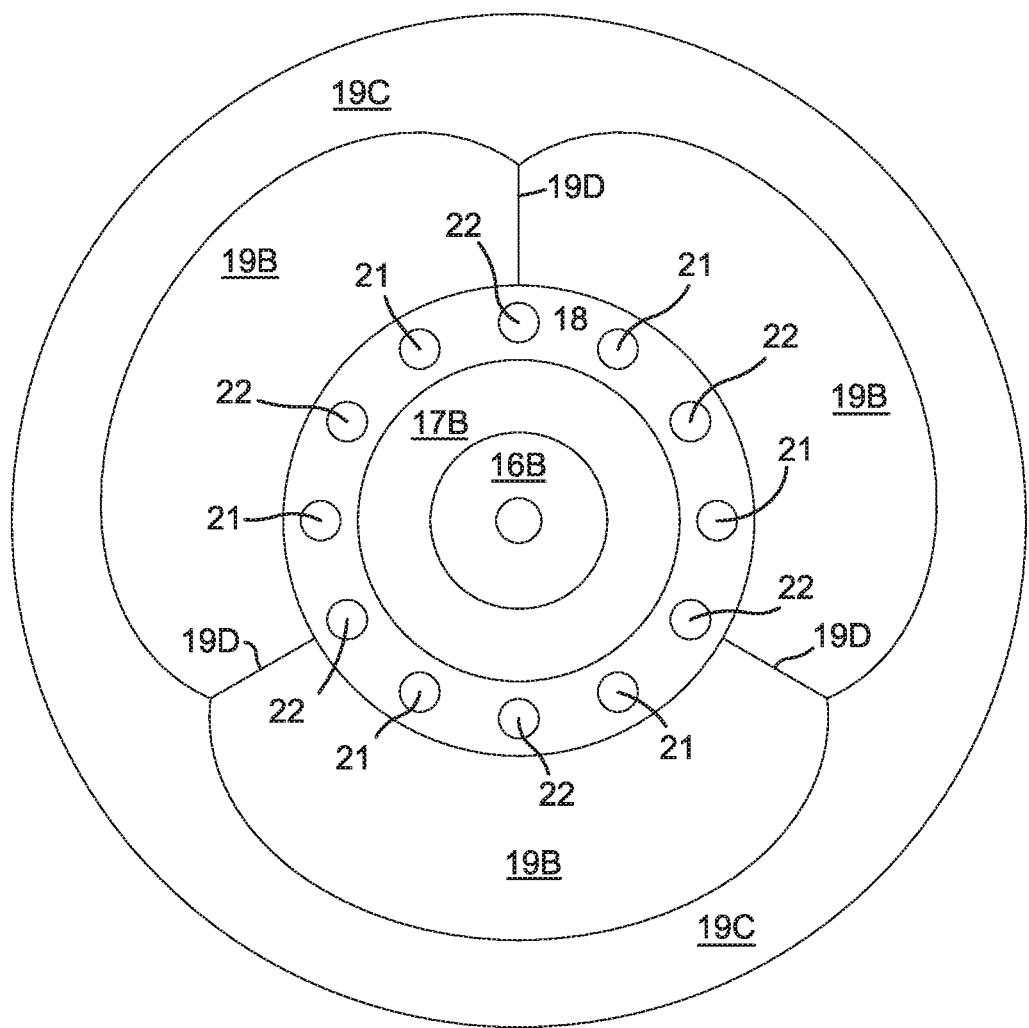
FIG. 3 is a plan view of the downstream end of a burner according to the present invention.

The elements 17B, 18, 19B, 19C, and 19D that appear in FIG. 1 are described herein with respect to FIGS. 2 and 3.

Turning next to FIG. 2, a cross-section is shown of an embodiment of the burner of the present invention.

Burner 1 includes the aforementioned outer housing 2. The burner that is shown includes burner body 11, whose outer surface 10B contacts inner surfaces 10A of the outer housing 2. For ease of fabrication of the burner, one may create inner body 11 and outer housing 2 separately and then assemble the burner by inserting inner body 11 into outer housing 2, ensuring that there is sufficient contact of surfaces 10A and 10B to provide good heat transfer from inner body 11 to the cooling water in passages 4 that will generally be provided in the flame collar section 19 of the outer housing 2. Alternatively, the burner 1 can be constructed so that it is of one unitary piece that constitutes the burner body. The burner 1 is typically installed through the wall of a furnace or steelmaking vessel, with the open end facing the interior of the furnace or vessel. Fabricating the burner 1 in the aforementioned two sections is advantageous in that after the burner composed of outer housing 2 together with inner body 11 has been installed, the inner body 11 can be replaced when it has become worn or damaged by simply removing it from within the outer housing 2 and installing a newer inner body 11 without having to remove the entire burner 1 from its placement in the wall of the furnace or vessel.

The body of the burner includes passageway 13 which extends from the closed end 20 of the body 11 through to the open downstream end 19C of the flame collar 19. Passageway 13 is preferably centered around a single central axis 12. The aforementioned line 8 for gaseous oxidant ends at outlet 8A which is preferably coaxial with axis 12. Outlet 8A is preferably located in passageway 13 within, or upstream from, conical converging section 14.

Conical converging section 14 includes an upstream end 14A and a downstream end 14C. The interior surface 14B of converging conical section should form a constant angle, preferably an angle of 2 to 30 degrees, relative to central axis 12 (that is, said angle is the angle that is formed in a plane in which axis 12 lies, if the line where the plane intersects the cone formed by converging section 14 is extended to intersect axis 12).

The downstream end 14C of conical converging section 14 is sealed to the upstream end 15A of throat section 15. (By "sealed" is meant herein that sections are connected to each other so that fluid cannot pass out of the passageway 13 through the connection between the sections, but can only pass in an axial direction from one section to the next.) Throat section 15 has constant diameter D throughout the extent of throat section 15 to its downstream end 15B. Throat section 15 preferably has an axial length but the throat section may also comprise a joint directly between the downstream end 14C of the conical converging section and the upstream end 16A of conical diverging section 16.

Downstream end 15B of the throat section is sealed to the upstream end 16A of conical diverging section 16. The interior surface 16B of the conical diverging section 16 extends to downstream end 16C at a constant angle, preferably an angle of 2 to 15 degrees, relative to central axis 12. One or more biasing gas openings 23A are present in body 11, each having a diameter "d" and each located in the throat section 15 or in the conical diverging section 16 and preferably at the intersection of downstream end 16A and upstream end 15C, or no further from that intersection than (3d/4) upstream from that intersection to (d/4) downstream of that intersection. The axis of each biasing gas opening 23A is perpendicular to central axis 12, or substantially perpendicular (that is, not more than 15 degrees from perpendicular) relative to central axis 12. The biasing gas openings 23A are connected through suitable valves and controls to biasing gas passageways 23 that are present in body 11 and can be connected to external sources of biasing gas (which can be gaseous fuel as is defined herein, or another gas such as nitrogen, argon or carbon dioxide, but is preferably gaseous oxidant as defined herein).

When two or more biasing gas openings 23A are present, they are preferably provided in locations that are all in the same plane that is perpendicular to the central axis 12, spaced apart from one another, preferably spaced symmetrically around the central axis 12. For example, if two openings 23A are present they are preferably 180 degrees apart, though they could be separated from each other at an angle of 30 degrees to 180 degrees. If three openings 23A are present, each is preferably 120 degrees apart from its nearest opening, though they could be separated from each other at angles of 30 degrees to 180 degrees. If four openings 23A are present, each is preferably 90 degrees apart from its nearest opening, though they could be separated from each other at angles of 30 degrees to 180 degrees. The spacing of the biasing gas openings 23A is selected according to the several different axial directions in which the flame 30 (seen in FIGS. 5A and 5B) is to be capable of being directed.

Downstream end 16C of conical diverging section 16 is sealed to the upstream end 17A of flared diverging section 17. The interior surface 17B of flared diverging section 17 extends to downstream end 17C. By "flared" is meant that, as is suggested by FIG. 2, interior surface 17B is curved, such that the angle between the central axis 12 and a line tangent to a point on the interior surface 17B increases with increasing distance of the point from the upstream end 17A of the flared diverging section. More specifically, in any plane in which central axis 12 lies, the line formed by the intersection of the plane with surface 17B is a section of a circle whose radius R is (D/4) to 3D, preferably D/2 to 3D (that is, one-fourth of D, or one-half of D, up to three times D).

FIG. 2 also depicts a distance L which is the axial (that is, parallel to axis 12) distance from the downstream end 15B of throat section 15 to the downstream end 17C of flared diverging section 17. In the present invention, it has been determined that proper results are attained in embodiments wherein L is a value in the range of D to 2D or even up to 4D (that is, D to two times D or up to four times D.).

The downstream end 17C of flared diverging section 17 is sealed to port surface 18, which is an annular circle that surrounds the opening at the end of flared diverging section 17 and which lies in a plane that is perpendicular to central axis 12. Surface 17B can flare outwards to an intersection at which it merges with port surface 18 smoothly, without any discontinuity, or downstream end 17C can intersect with port surface 18 at an angle or corner.

Numerous ports 21 and 22 open in the top surface of port surface 18, as can be seen in FIGS. 1, 2 and 3. The axis of each port 21 and 22 is parallel to central axis 12. There are preferably 4 to 20 first ports 21, which are connected through suitable conduits and controls to fuel feed line 5. The number of first ports 21 is preferably 6 to 12, and more preferably 8 to 10. There are preferably 4 to 20 second ports 22, which are connected through suitable conduits and controls to oxidant feed line 6. The number of first ports 22 is preferably 6 to 12, and more preferably 8 to 10. The ports 21 and 22 should each be of a diameter such that taken together the flows of oxidant and fuel out of the ports form a stable flame. In practicality, the ports are typically one quarter inch to one inch in diameter, depending on the overall size of the burner and the flow rates through the ports. Ports 21 are positioned substantially evenly around port surface 18, relatively uniformly distant from central axis 12 (preferably in a circle). Ports 22 should also be positioned substantially evenly around port surface 18, relatively uniformly distant from central axis 12 (preferably in a circle). The ports 21 and 22 can lie all on the same circle, in which case they preferably alternate with each other so that there is always a port 21 between two ports 22 and always a port 22 between two ports 21, and each port 21 and 22 is relatively uniformly distant from central axis 12. Alternately, ports 21 may lie on a circle of a first diameter and ports 22 lie on a circle of a second diameter which is greater than or less than the first diameter. In such a construction, the ports 21 and 22 should preferably be staggered, meaning that a radius from the central axis to a first port is always between radii to two different second ports, and vice versa. In another alternative, pairs of ports 21 and 22 can be on the same radius from the central axis.

As used herein, ports are "substantially evenly" located around central axis 12 if the angles between each pair of adjacent radii from the central axis 12 through the center of each port are each within 5 degrees of (360/N) where N is the number of ports, and are "evenly" located around central axis 12 if the angles between every pair of adjacent radii are within 1 degree of (360/N). For example, if there are 12 ports, they are considered to be substantially evenly located around central axis 12 if the angle between each pair of adjacent radii is from 25 degrees to 35 degrees, and evenly located if each such angle is 29 to 31 degrees.

As used herein, ports being "relatively uniformly distant" from the central axis 12 means that, with reference to the port whose center is closest to central axis 12, none of the other ports in the group are completely outside of a circle whose center is on the central axis and whose radius is the distance to the outermost edge of that reference port, and a group of ports are "substantially uniformly distant" from the central axis 12 if, with reference to that reference port, no portion of the other ports in the group is at all outside of a circle whose center is on the central axis and whose radius is the distance to the outermost edge of that reference port.

Flame collar 19 surrounds the open end of flared diverging section 17 and is coaxial with central axis 12. Flame collar 19 has an upstream end 19A which is sealed to port surface 18 at a location that is farther from central axis 12 than the distance of ports 21 and 22 from central axis 12. Flame collar 19 has a downstream end 19C whose diameter is larger than the diameter of its upstream end 19A. Downstream end 19C is located a distance downstream from the port surface 18 that is at least 5% (preferably at least 15%, and more preferably at least 25%) of the distance across the open end 19C of the flame collar.

Flame collar 19 contains passageways 4 within the flame collar through which cooling water (or other coolant) can flow to absorb heat generated by combustion occurring at the burner, and to absorb heat that emanates from the furnace into which the flame is directed.

Flame collar 19 also has exposed surface 19B that faces central axis 12 and extends from the upstream end 19A to downstream end 19C. Exposed surface 19B, rather than being merely conical or flared in shape, includes one or more specially curved regions, not previously known, that provide operational advantages. The number of these specially curved regions should equal the number of biasing gas openings 23A in the burner.

Each curved region lies on the surface of a different cone that opens outward toward the downstream end 19C of the flame collar 19. The axis of each different cone has several characteristics: it lies in the same plane in which lie both the central axis 12 and the axis of a different one of the biasing gas openings 23A; and it extends from the central axis 12 at the downstream end 15B of the throat section 15 in a direction parallel to the interior surface 16B of the conical diverging section 16 on the side opposite the location of the associated biasing gas opening 23A. That is, the axis of each such different cone is on the side of the burner that is opposite ("away") from the biasing gas opening that is associated with that cone and its axis.

Figure 4:
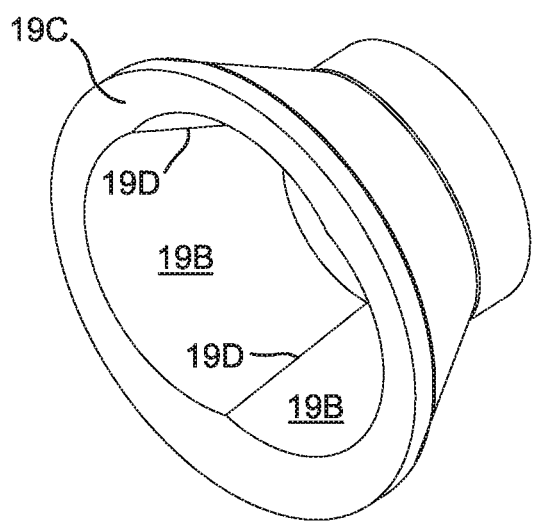
FIG. 4 is a perspective view of one portion of one embodiment of the present invention.

FIGS. 3 and 4 illustrate these specially curved regions in a flame collar having three of such regions, which would be used in a burner that has three biasing gas openings. As can be seen, each specially curved region is bounded by ridges 19D. Between a given pair of adjacent ridges 19D, the surface of each cone would contact and define a distinct specially curved region of surface 19B, whereas the remainder of that cone outside the pair of adjacent ridges would not contact any surface 19B and would not define any other portion of the surface 19B.

Figure 5A:
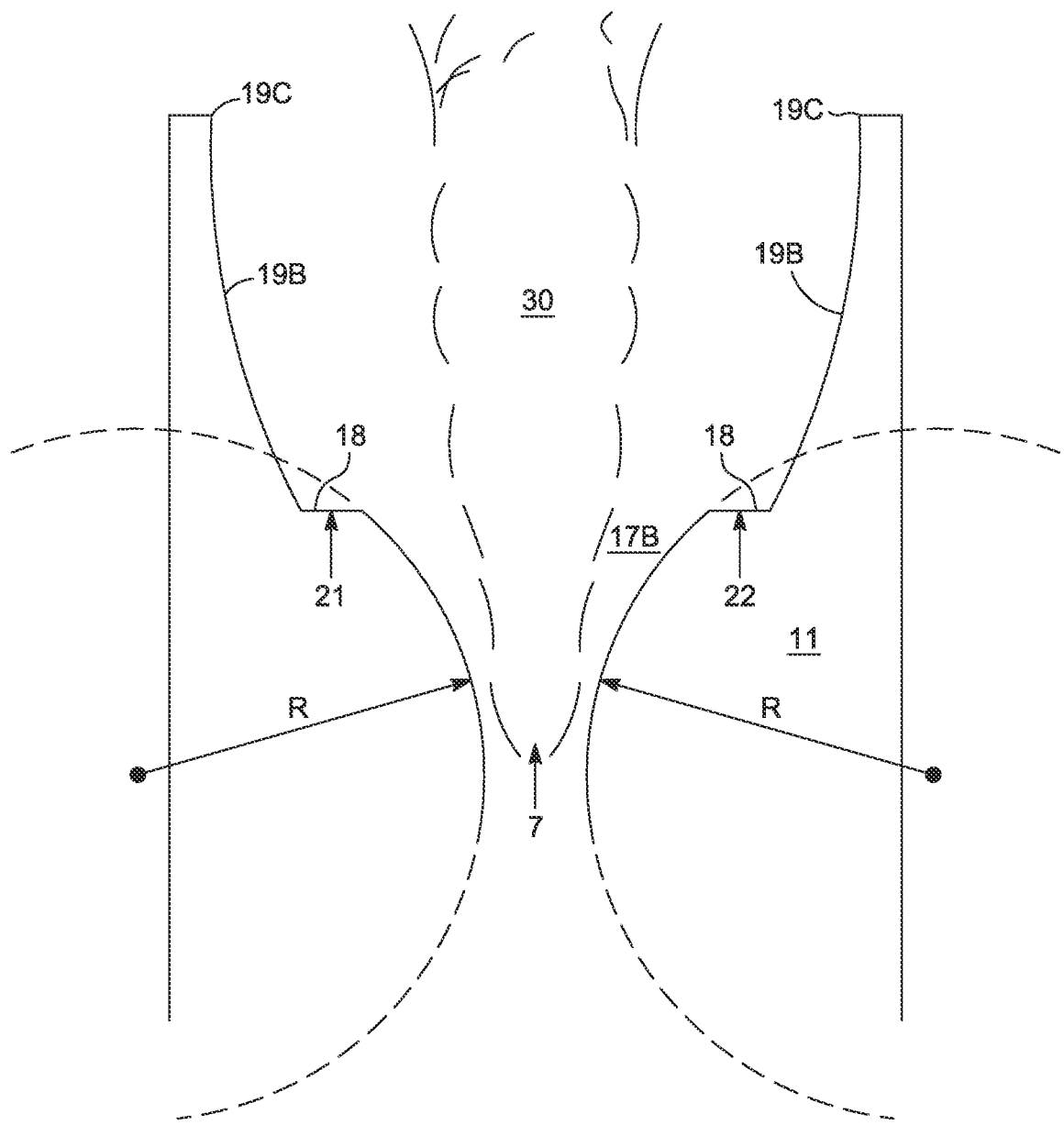
FIGS. 5A and 5B are cross-sectional views of a portion of a burner according to the present invention, in different modes of operation of the burner.
Figure 5B:
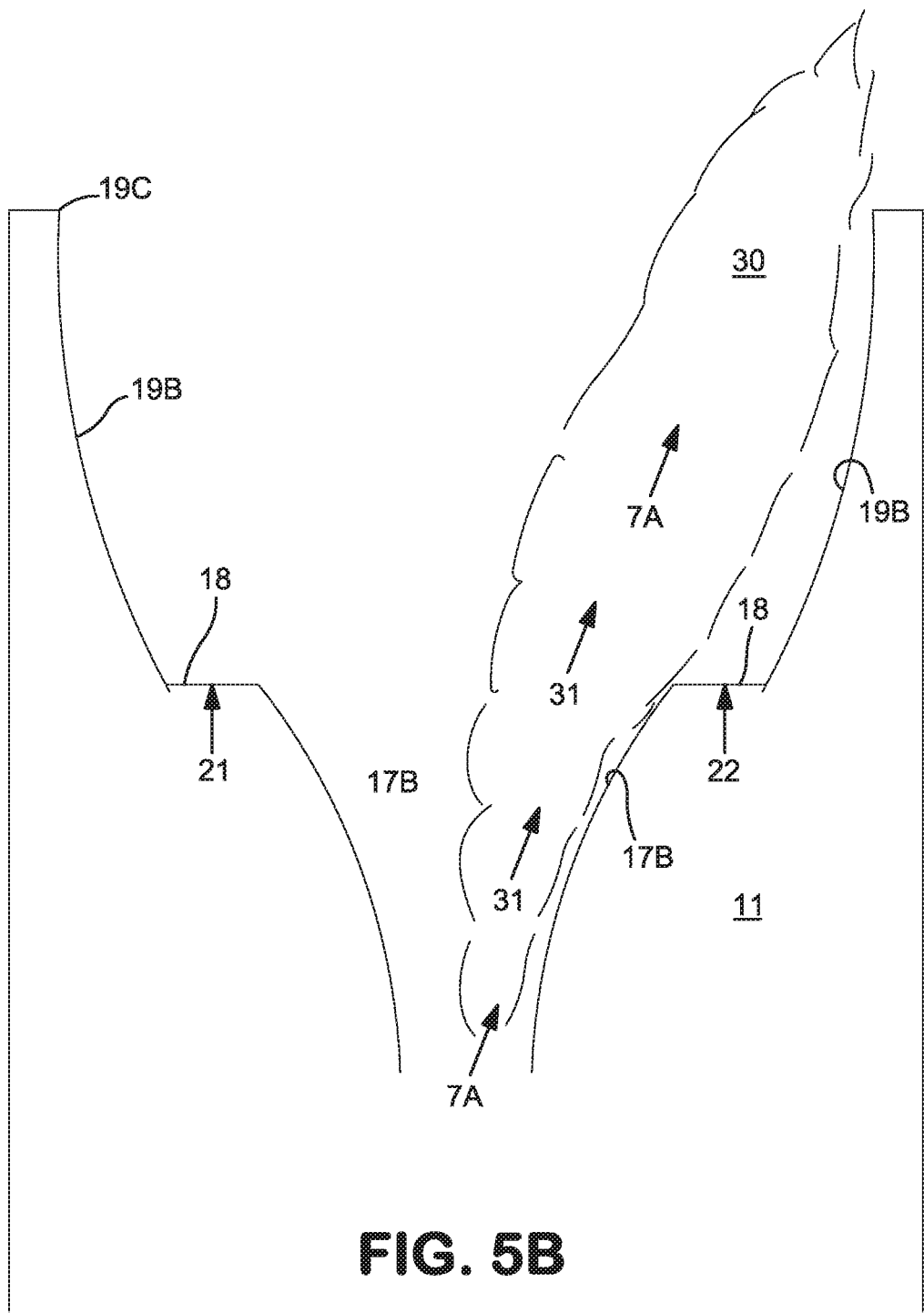

FIGS. 5A and 5B illustrate the relationship between the specially curved regions of flame collar surface 19B, and a flame that is generated and axially biased as described further herein. When no biasing gas is ejected from any biasing gas opening, a flame formed by combustion of fuel fed from ports 21, and stream 7 of oxidant fed from outlet 8A, and oxidant fed from ports 22, extends out of burner 1 along axis 12, generally coaxial and parallel with axis 12. The flame will take a generally conical shape expanding away from the burner. Such a flame is depicted in FIG. 5A as flame 30.

When the axis of the flame 30 is altered from being coaxial or parallel to axis 12, to new axial alignment 31 (such as by ejection of biasing gas from a biasing gas opening 23A as described further herein to deflect the stream 7 of oxidant that flows past opening 23A), the stream 7 will pass along the surface 16B, and will tend to follow surface 17B (exhibiting the so-called Coanda effect), and will combust with fuel from ports 21 as flame 30 that expands in a generally conical shape in the flame collar 19 around direction 7A (as shown in FIG. 5B). This tendency of the flame to expand in a generally conical shape will cause a portion of the flame to contact the specially curved portion of surface 19B that forms the conical section as described herein. Providing the specially curved portion of surface 19B provides advantages including protecting the flame collar and the port surface 18 from excessive heat from the flame or from the furnace into which the flame is directed.

In operation according to the present invention, stream 7 of gaseous oxidant is fed into burner 1 from outlet 8A, and gaseous oxidant is fed out of ports 22 into flame collar 19, and fuel is fed out of ports 21 into flame collar 19, and the fuel from the port surface and the oxidant both from the port surface and the outlet 8A are ignited and combusted to form a flame. The flame extends from passageway 13 in the flame collar 19 out of the open end of the flame collar.

As stated above, if no biasing gas is being ejected from any of the biasing gas openings 23A, the flame will emerge from the open end of the burner parallel or coaxial to central axis 12. Intermittently, biasing gas is ejected from one or more biasing gas openings 23A at a rate sufficient to impinge upon the stream 7 of gaseous oxidant as it passes the biasing gas openings. This impingement alters the axis of the oxidant stream from what had been its axial direction (whether parallel or coaxial to axis 12 or already at an angle to axis 12), to another axial direction 7A. The flame 30 that is formed by combustion of fuel with the oxidant in deflected stream 7A and with the oxidant from ports 22 still emerges out of the open end of burner 1, but in a different axial direction. Where two or more biasing gas openings are present, it is possible to eject biasing gas from one biasing gas opening and then from a different biasing gas opening, or from each of them, so that the axial direction of the flame is altered from one direction that is not parallel to axis 12, to another direction that is also not parallel to axis 12. It should be noted that a flame axial direction that is parallel to axis 12 is then simply yet another axial direction in which the flame can be directed. Accordingly, it is possible to vary the axial direction of the flame in each of many different directions, one of which can be parallel to axis 12, in any desired sequence of axial directions.

This ability to vary the axial direction of the flame 30 can be utilized in melting solid material such as scrap metal in a steelmaking furnace. For example, one can direct the flame at a particular region of the material, and then alter the axial direction of the flame to contact a different region of the material. Then, the axial direction can be altered again, to a third direction so as to contact the flame with a third region of the material or back to a previous direction to continue heating a region that was previously being heated, and so forth. It is preferred to continue contacting the flame with one region of material until the material at that region is partially or completely melted, and then to alter the axial direction of the flame to heat the material there until it is partially or completely melted, and then to move on yet another region of material to partially or completely melt it, and so forth. However, in any of these steps, the flame may be used to heat the material without melting any of it, if one desires to operate in such a manner.

A preferred implementation of this invention is the melting of feed material, such as scrap metal, in a steelmaking furnace. In any implementation, but especially in a steelmaking furnace, there are additional steps to perform. That is, when the material has been completely melted, the flow of oxidant is continued out of outlet 8A but now at a higher velocity that is sufficient that this oxidant stream emerges from the open end of flame collar 19 at a supersonic velocity. At this point, feeding of fuel and oxidant out of ports 21 and 22 are continued, and combust and form a flame shroud around the oxidant stream that emerges from the open end of flame collar 19. The velocity of the oxidant stream must be high enough that the oxidant stream reaches the surface of molten metal in the furnace and penetrates into the molten metal. The flame shroud stabilizes this oxidant stream.

EXAMPLE

The table below contains sample operating conditions for one burner designed for a specific furnace. Even though the actual velocity employed in a given burner will depend on the overall heating requirement, the velocities employed in burners according to this invention will remain in the range of 200-1000 fps (feet per second). A minimum O2 port 22 velocity of 400 fps and a minimum natural gas port 21 velocity of 650 fps have been found to be useful for ideal operation in electric arc furnaces.

|  | Main O2 (8A) (central passageway) velocity, fps (at throat - D) | Shroud O2 (ports 22) velocity - fps | Shroud NG (ports 21) velocity - fps | Bias gas openings velocity - fps |
| --- | --- | --- | --- | --- |
| Burner mode 1 | 550 | 412 | 676 | 400 |
| Burner mode 2 | 780 | 597 | 977 | 660 |
| Burner mode 3 | 972 | 597 | 977 | velocity of main O2 (8A) is too high to be deflected |
| High velocity mode 1 | 979 (sonic) | 357 | 588 | no bias flow |
| High velocity mode 2 | 979 (sonic) | 357 | 588 | no bias flow |
| High velocity mode 3 | 979 (sonic) | 408 | 670 | no bias flow |

What is claimed is:

1. A multifunctional burner, comprising (A) a body having:

a passageway through the body which has a central axis, wherein the passageway includes a conical converging section, a throat section, a conical diverging section, and a flared diverging section, all of which are coaxial with the central axis, wherein the conical converging section has an open upstream end and an open downstream end, wherein the width of the conical converging section decreases in the direction toward its downstream end, wherein the interior surface of the converging section forms a constant angle relative to the central axis;

the throat section has an open upstream end that is sealed to the downstream end of the conical converging section, and an open downstream end, and has a diameter D which is constant between its upstream and downstream ends;

the conical diverging section has an open upstream end that is sealed to the downstream end of the throat section and an open downstream end, wherein the width of the conical diverging section increases in the direction toward its downstream end, wherein the interior surface of the conical diverging section forms a constant angle relative to the central axis;

the flared diverging section has an open upstream end that is sealed to the downstream end of the conical diverging section and an open downstream end, wherein the width of the flared diverging section increases in the direction toward its downstream end, wherein the angle between the central axis and a line tangent to a point on the interior surface of the flared diverging section increases with increasing distance of the point from the upstream end of the flared diverging section, and wherein, in a cross-sectional plane that contains the central axis, the interior surface of the flared diverging section is a section of a circle of radius R wherein the value of the radius R is between D/4 and 3D;

wherein the axial distance L from the downstream end of the throat section to the downstream end of the flared diverging section is D to 4D;

(B) two, three or four biasing gas passageways within the body of the burner, each ending in a downstream biasing gas opening in the throat section or the conical diverging section whose axis is perpendicular to the central axis or not more than 15 degrees from perpendicular relative to the central axis, each downstream biasing gas opening having a diameter d, wherein each downstream biasing gas opening opens in the throat section or the conical diverging section at a point within the range of from 3d/4 upstream to d/4 downstream of the point at which the downstream end of the throat section is sealed to the upstream end of the conical diverging section, each biasing gas passageway having an inlet which can be connected to a source of biasing gas;

(C) an annular port surface that lies in a plane perpendicular to the central axis and that surrounds and is sealed to the downstream end of the flared diverging section;

4 to 20 first ports in the annular port surface whose axes are parallel to the central axis, wherein the first ports are connected by first passageways within the body of the burner to one or more inlets through which gaseous fuel can be fed from outside the burner, and 4 to 20 second ports in the annular port surface whose axes are parallel to the central axis, wherein the second ports are connected by second passageways within the body of the burner to one or more inlets through which gaseous oxidant can be fed from outside the burner, the first and second passageways being separate from each other;

wherein the first ports are positioned in the port surface around the central axis such that the angles between each pair of adjacent radii from the central axis through the center of each first port are each within 5 degrees of (360/N) where N is the number of first ports, and with reference to the first port whose center is closest to the central axis no portion of the first ports other than said first port to which reference is made is at all outside of a circle whose center is on the central axis and whose radius is the distance to the outermost edge of said first port to which reference is made, and the second ports are positioned in the port surface around the central axis such that the angles between each pair of adjacent radii from the central axis through the center of each second port are each within 5 degrees of (360/N) where N is the number of second ports, and with reference to the second port whose center is closest to the central axis no portion of the second ports other than said second port to which reference is made is at all outside of a circle whose center is on the central axis and whose radius is the distance to the outermost edge of said second port to which reference is made;

(D) a flame collar surrounding and coaxial with the central axis, and having (i) an upstream end that is sealed to the port surface further from the central axis than the distance of the first and second ports from the central axis, (ii) an open downstream end whose diameter is larger than the diameter of its upstream end and which is located a distance downstream from the port surface that is at least 5% of the distance across the open downstream end of the flame collar, and (iii) an exposed surface that faces the central axis and extends from the upstream end to the downstream end, wherein the exposed surface includes two, three or four curved regions equal in number to the number of biasing gas openings, wherein each curved region lies on the surface of a different cone that opens outward toward the downstream end of the flame collar, the axis of each cone lying in the plane of the central axis and the axis of a different one of the biasing gas openings and extending from the central axis at the downstream end of the throat section in a direction parallel to the interior surface of the conical diverging section on the side opposite the location of the associated biasing gas opening; and (iv) passageways within the flame collar through which coolant can flow to absorb heat generated by combustion occurring at the burner; and (E) an outlet within the body in the conical converging section or upstream from the conical converging section from which gaseous oxidant can be fed into the body into the conical converging section along the central axis wherein said outlet is connected by a passageway in the body of the burner to an inlet through which gaseous oxidant can be fed from outside the burner.

2. The multifunctional burner according to claim 1 wherein the interior surface of the converging section forms a constant angle of 2 degrees to 30 degrees relative to the central axis.

3. The multifunctional burner according to claim 1 wherein the interior surface of the conical diverging section forms a constant angle of 2 degrees to 15 degrees relative to the central axis.

4. The multifunctional burner according to claim 1 wherein the first ports and the second ports are positioned alternating with each other in the port surface substantially uniformly distant from the central axis of the passageway.

5. The multifunctional burner according to claim 1 wherein the interior surface of the flared diverging section is a section of a circle of radius R which is in the range of D/2 to 3D.

6. The multifunctional burner according to claim 1 wherein the axial distance L from the downstream end of the throat section to the downstream end of the flared diverging section is D to 2D.

7. A method of treating material within a melting vessel, comprising (A) feeding gaseous oxidant into the conical converging section of a burner according to claim 1, past the biasing gas openings and into the flame collar of said burner, feeding gaseous oxidant out of the second ports of said burner into the flame collar, and feeding gaseous fuel out of the first ports of said burner into the flame collar, and combusting said fuel and said gaseous oxidant in the flame collar to form a flame that emerges from the body of the burner past the open end of the flame collar along an axis;

(B) contacting the flame with material in a melting vessel at a first surface of the material and heating the material with the flame;

(C) intermittently feeding biasing gas out of the downstream end of a biasing gas opening and contacting the biasing gas with the gaseous oxidant passing the opening to alter the axis of the oxidant and thereby altering the axis of the flame to another axis with the biasing gas, and contacting the flame, when its axis has been altered, with the material in the melting vessel and heating the material with the flame;

(D) repeating step (C) until the material is completely molten;

and then (E) discontinuing the feeding of biasing gas; and (F) ejecting a stream of gaseous oxidant from within the passageway out of the flame collar at a supersonic velocity to penetrate through the surface of the molten material, while passing fuel out of the first ports, passing gaseous oxidant out of the second ports, and combusting said fuel and gaseous oxidant to establish a flame envelope around the stream of gaseous oxidant.

8. The method according to claim 7 wherein the stream of gas that is fed in step (F) comprises oxygen.

9. The method according to claim 7 wherein the stream of gas that is fed in step (F) comprises nitrogen.

10. The method according to claim 7 wherein the stream of gas that is fed in step (F) comprises argon.

11. The method according to claim 7 wherein the stream of gas that is fed in step (F) comprises carbon dioxide.

* * * * *